United States Patent
Enroughty

(10) Patent No.: US 8,041,608 B2
(45) Date of Patent: Oct. 18, 2011

(54) SYSTEMS AND METHODS FOR OFFERING WIRELESS FINANCIAL ACCOUNTS

(75) Inventor: Diane Enroughty, Richmond, VA (US)

(73) Assignee: Capital One Financial Corporation, McLean, VA (US)

(*) Notice: Subject to any disclaimer, the term of this patent is extended or adjusted under 35 U.S.C. 154(b) by 1205 days.

(21) Appl. No.: 11/486,039

(22) Filed: Jul. 14, 2006

(65) Prior Publication Data
US 2008/0015946 A1    Jan. 17, 2008

(51) Int. Cl.
*G06Q 40/00* (2006.01)
(52) U.S. Cl. .......................... 705/26; 705/30
(58) Field of Classification Search ............ 705/10–44
See application file for complete search history.

(56) References Cited

U.S. PATENT DOCUMENTS

| | | | |
|---|---|---|---|
| 6,912,398 B1 | 6/2005 | Domnitz | |
| 7,530,490 B1* | 5/2009 | Finkemeier et al. | 235/379 |
| 2001/0056402 A1 | 12/2001 | Ahuja et al. | |
| 2004/0002916 A1 | 1/2004 | Timmerman et al. | |
| 2004/0035923 A1 | 2/2004 | Kahr | |
| 2004/0225602 A1* | 11/2004 | Smith | 705/39 |
| 2005/0160003 A1 | 7/2005 | Berardi et al. | |
| 2005/0209955 A1* | 9/2005 | Underwood et al. | 705/38 |

FOREIGN PATENT DOCUMENTS
WO    WO 9722073 A1 *    6/1997

\* cited by examiner

*Primary Examiner* — Frantzy Poinvil
(74) *Attorney, Agent, or Firm* — Finnegan, Henderson, Farabow, Garrett & Dunner, LLP

(57) ABSTRACT

Systems and methods consistent with the invention may offer a new financial account having a balance transfer sub-account for implementation onto a customer's wireless purchasing device. The purchasing device may have a wireless transmitter that may communicate account information stored on the purchasing device to a service terminal. Based on the account information received by the service terminal, the system may obtain the terms of the customer's current account associated with the purchasing device. The system may then determine the terms of the new account for offering to the customer. If the customer accepts the offered account, the terminal may then wirelessly reprogram the purchasing device with the information of the new account and transfer the balance of the customer's original account to the balance transfer sub-account of the new account.

19 Claims, 3 Drawing Sheets

SYSTEMS AND METHODS FOR OFFERING WIRELESS FINANCIAL ACCOUNTS

FIELD OF THE INVENTION

The present invention relates generally to methods and systems for offering financial accounts and, more particularly, to offering financial accounts associated with a wireless purchasing device.

BACKGROUND OF THE INVENTION

In a conventional credit card transaction, a credit card holder presents a financial account card, such as a credit card, to a merchant. The merchant typically swipes a magnetic stripe on the credit card through a card reader that is built into or attached to a point-of-sale (POS) terminal. The magnetic stripe generally includes account information, such as an account number of the card, an identity of the card holder, and an expiration date of the card. Once the merchant has swiped the card through the card reader, the account information is transmitted to the POS terminal. Alternatively, instead of the merchant swiping the card, the credit card holder may personally swipe the card at a self service check out station or may insert the card into a card reader built into, for example, a gasoline pump. Once the card reader has read the card data, the card data is transmitted over a secure network, authenticated, and ultimately used to authorize a transaction. In any of these kinds of transactions, however, the credit card must be physically read by a magnetic stripe reader in order to obtain the card data that is stored on the magnetic stripe.

It is also known in the art that, to attract new customers, a credit card issuer may offer a new credit card account having a balance transfer sub-account in addition to a credit line sub-account. With such an offer, the prospective cardholder may transfer the balance of a debt owed on another credit card account to the offered balance transfer sub-account. Upon transferring the balance, the issuer pays off the debt on the cardholder's original account and, after expiration of an initial grace period (if any), then charges the cardholder interest on the transferred balance. When the cardholder makes payments to the issuer, the payments are split between the credit line and balance transfer sub-accounts by a predetermined arrangement (e.g., in proportion to the balances on the respective accounts).

Determining whether the new credit card offers more favorable terms is often difficult for the new customer. For instance, the customer must often call the issuer to compare terms of the customer's existing credit card account with the offered credit card account. Further, because the terms of an advertised credit card account may differ from the terms of the account actually offered after completing an application process, the customer typically needs to compare the account terms a second time after the issuer accepts the customer's application and offers an actual credit card account. Moreover, the customer must often wait a substantial amount of time to receive the new credit card and thus cannot use it to make purchases in the meantime.

Further, as the prevalence of wireless devices continues to increase, new methods of storing and transmitting credit card data have begun to emerge in the art. For example, RFID (radio frequency identification) tags have been used to transmit payment information. RFID tags are microchips that may transmit and receive data, as well as store and encrypt that data. An RFID tag thus acts as a transponder by transmitting a radio frequency signal when it receives a query radio signal from another device. Typically, the other device is an RFID reader that sends a query signal requesting a nearby RFID tag to transmit data to the RFID reader. When the RFID tag receives the query signal, it may be powered into an "on" state. Alternatively, the RFID tag may have its own independent power supply. In either case, when an RFID tag receives a query radio signal, it may respond by transmitting data to the reader up to a distance of several inches or feet away, depending upon its power capabilities. Such RFID payment technology has not, however, overcome the disadvantages discussed above with respect to offering new credit cards having balance transfer sub-accounts.

Accordingly, there is a need for a way to offer new financial accounts to customers of existing accounts that may overcome the above disadvantages.

SUMMARY OF THE INVENTION

Consistent with embodiments of the present invention, systems and methods are disclosed that provide enhanced financial account offering processes for wireless purchasing devices.

Consistent with one exemplary embodiment of the present invention, a method is provided for offering, to a holder of a purchasing device, a new financial account for association with the purchasing device. The method may include wirelessly reading account information stored on the purchasing device. The wirelessly read account information may identify an existing financial account associated with the purchasing device. The method may also include obtaining information about the existing financial account based on the wirelessly read account information. The obtained information may reflect an outstanding balance associated with the existing financial account. Further, the method includes generating, based on the obtained information, terms for the new financial account for offering to the holder of the purchasing device and wirelessly reprogramming the purchasing device with information reflecting the new financial account if the offer is accepted. The outstanding balance of the existing financial account is then transferred to a balance transfer sub-account associated with the new account.

Consistent with another exemplary embodiment of the present invention, a method is provided for offering, to a holder of a purchasing device, a new financial account for association with the purchasing device. The method may include wirelessly reading account information stored on the purchasing device. The wirelessly read account information may identify an existing financial account associated with the purchasing device. The method may also include obtaining terms of the existing financial account based on the wirelessly read information identifying the existing financial account, generating terms for the new financial account based on the obtained terms of the existing financial account, and offering the new financial account to the holder of the purchasing device. The method may also include wirelessly reprogramming the purchasing device with information reflecting the new financial account if the offer is accepted.

Consistent with still another exemplary embodiment of the present invention, a system is provided for offering, to a holder of a purchasing device, a new financial account for association with the purchasing device. The system may include a publicly accessible kiosk terminal including a wireless reader for reading account information stored on the purchasing device when a holder of the purchasing devices places the purchasing device within a communication range of the wireless reader. The wirelessly read account information may identify an existing financial account associated with the purchasing device. Further, the system may include a processing unit for determining terms of a new financial account for offering to the holder of the purchasing device based on the wirelessly read account information associated with the existing financial account and an interface unit for providing, to the holder of the purchasing device, information about the terms of the new financial account and the terms of the existing financial account. The interface unit may receive an indication that the holder of the purchasing device has accepted the offer of the new financial account. The system may also include a wireless writer for reprogramming the purchasing device with information reflecting the new financial account if the holder of the purchasing device accepts the offer.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention. In the drawings.

DESCRIPTION OF THE EMBODIMENTS

Figure 1:
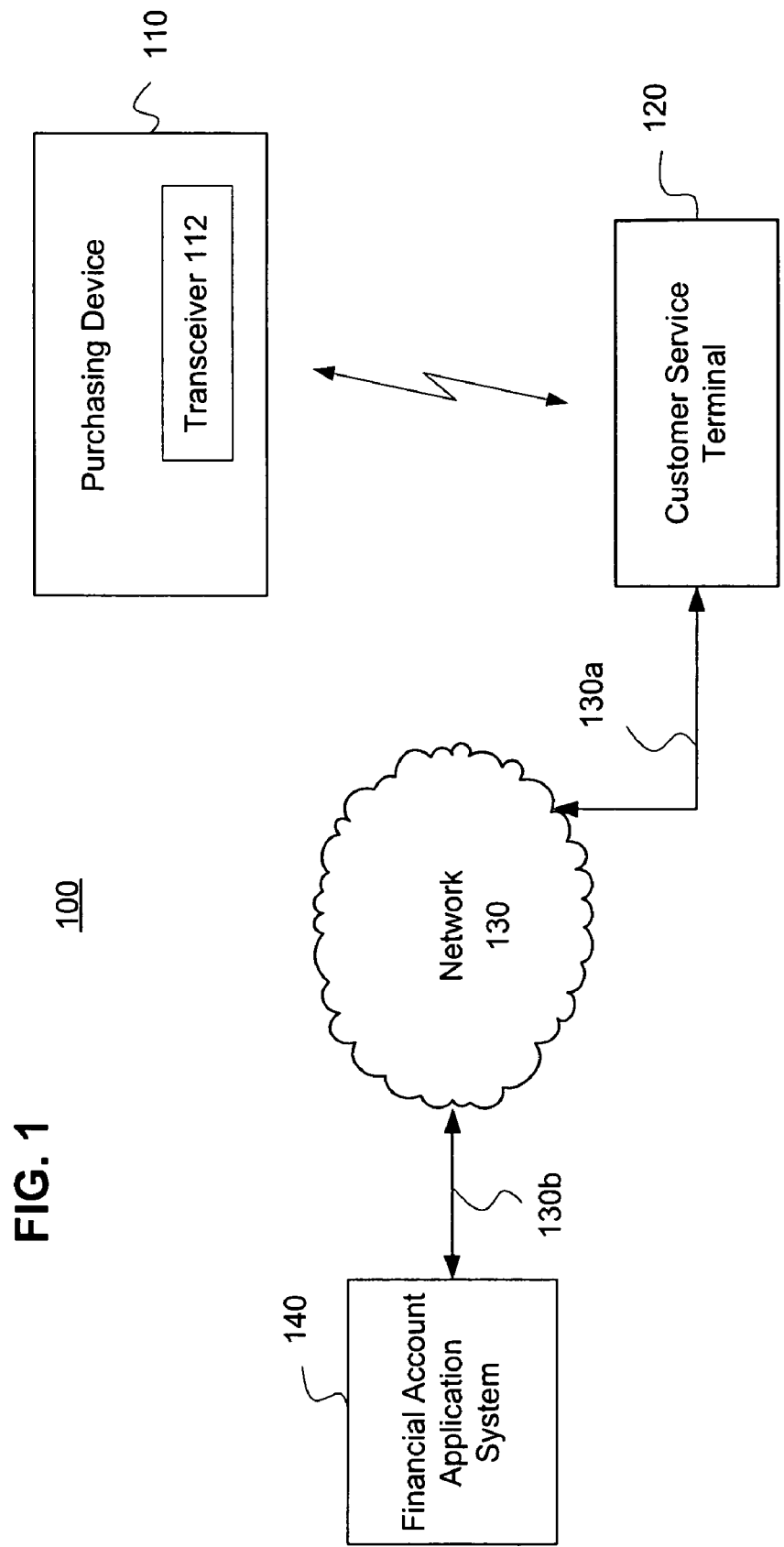
FIG. 1 illustrates an exemplary financial account offering system consistent with certain embodiments of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations, and other implementations are possible, without departing from the spirit and scope of the invention. Accordingly, substitutions, additions, or modifications may be made to one or more of the components and process steps illustrated in the drawings and described below. The following detailed description, therefore, does not limit the invention. Instead, the proper scope of the invention is defined by the appended claims.

Systems and methods consistent with the present invention may offer a new financial account having a balance transfer sub-account for implementation onto a customer's purchasing device. As used herein, the term "purchasing device" refers to any type of product associated with a financial account and used for making a purchase transaction. For example, a purchasing device may be a credit card, a check card, a debit card, or any other type of card or device associated with a financial account offered by a financial entity, such as a bank, merchant, government entity, etc.

In certain embodiments, the purchasing device may be in the form of a card having a wireless transmitter, such as a radio frequency Identification (RFID) tag. The wireless transmitter may communicate account information stored on the purchasing device to a service terminal. Based on the account information received by the service terminal, systems consistent with certain disclosed embodiments may obtain the terms of the customer's current account associated with the purchasing device. Based on the information about the customer's current account, as well as other data about the customer, the system may then determine the terms of the new account for offering to the customer. If the customer accepts the offered account, the service terminal may then wirelessly reprogram the purchasing device with the information of the new account and transfer the balance of the customer's original account to the balance transfer sub-account of the new account.

FIG. 1 illustrates an exemplary system 100 consistent with the present invention. As shown in FIG. 1, system 100 may include a purchasing device 110, a customer service terminal 120, a network 130, and a financial account application system 140. While FIG. 1 shows customer service terminal 120 communicating with only one purchasing device 110, systems consistent with the invention may allow terminal 120 to communicate with any number of purchasing devices 110.

Purchasing device 110 may have typical features of a financial account product (e.g., a credit card), such as a magnetic strip containing associated financial account information (e.g., account number, card holder's name, etc.). Additionally or alternatively, purchasing device 110 may also include a transceiver 112 that may have one or more processors, one or more memory devices, and a wireless transmitter device. Transceiver 112 may either be attached to or embedded into purchasing device 110.

In certain embodiments, transceiver 112 may operate as a transceiver that receives and transmits data from purchasing device 110. In one embodiment, transceiver 112 may operate as a transponder that transmits, for example, a wireless signal (e.g., a radio frequency signal) in response to a received query signal provided by another remote system. Depending on the type of technology implemented by certain disclosed embodiments, the range of communications provided by transceiver 112 may vary. For instance, transceiver 112 may include an RFID transceiver that is configured to send and/or receive communication signals from a remote terminal, such as customer service terminal 120, positioned several inches or feet from purchasing device 110. Accordingly, methods and systems consistent with certain disclosed embodiments are not limited to any type of transmitting or receiving device.

Further, in embodiments consistent with the invention and as described in more detail below, transceiver 112 may transmit a signal including the account information associated with a financial account that is currently associated with purchasing device 110. Transceiver 112 may, for example, transmit the account information to a point-of-sale terminal (not shown) when a customer uses purchasing device 110 to make a purchase transaction. In such situations, transceiver 112 communicates account information to the point-of-sale terminal to allow authorization of a purchase transaction, as known in the art, made using purchasing device 110. In embodiments consistent with the invention, transceiver 112 may also transmit account information to customer service terminal 120 for obtaining information on a new account having a balance transfer sub-account and which the customer may have associated with purchasing device 120.

Customer service terminal 120 may be any type of computer system or terminal that may process wirelessly received information and output information to a customer. Service terminal 120 may thus include any components used to process information associated with a customer financial account. For example, terminal 120 may include a wireless reader (e.g., an RFID reader, a bluetooth reader, etc.), a processor or computer system (e.g., a laptop, desktop, mainframe, etc.), a user interface (e.g., a display screen, an audio interface, a telephone, etc.), or any other type of component that may receive wireless data from transceiver 112 and transmit information to a financial account application system, such as financial account application system 140, and output information to a customer. Alternatively, embodiments may be implemented that enable transceiver 112 to send account information directly to financial account application system 140 over network 130 using, if necessary, intermediate devices, such as transceivers, routers, etc.

In certain embodiments, customer service terminal 120 may include components that send a signal to activate transceiver 112, thus directing transceiver 112 to send account information associated with purchasing device 110. Service terminal 120 may also send account information to financial account application system 140 through network 130. Customer terminal 120 may be located at a merchant location where a customer holding purchasing device 110 may physically enter and purchase goods or services. Terminal 120 may, however, be located at any remote location (e.g., in a shopping center, airport, train station, etc.) and may be in the form of a kiosk or other type of terminal for facilitating customer interaction. In such arrangements, any number of customers having respective purchasing devices 110 may access service terminal 120. Alternatively, customer service terminal 120 may be a terminal dedicated to a particular customer. For example, in embodiments where purchasing device 110 is used to perform on-line purchase transactions over the Internet, terminal 120 may be a device associated with a computer system (not shown) used by a customer to perform on-line purchase transactions.

In one embodiment, customer service terminal 120 may be configured to send an activation signal to transceiver 112 when the customer positions purchasing device 110 within the communication range of terminal 120. For example, a customer desiring to obtain information on a new financial account may place purchasing device 110 within an electromagnetic zone of an RFID reader (not shown) of terminal 120. The RFID reader may emit activation signals that are received by transceiver 112. In response to the activation signals, transceiver 112 may be activated, retrieve account information from a memory device stored on transceiver 112 and/or purchasing device 110, and provide that information to service terminal 120. Terminal 120 may receive the account information from transceiver 112 and, in exemplary embodiments, may send to account application system 140 a request for the terms of a new financial account for offering to the customer. As shown in FIG. 1, customer service terminal 120 may communicate with application system 140 via a network 130.

Network 130 may include, alone or in any suitable combination, a telephony-based network, a local area network (LAN), a wide area network (WAN), a dedicated intranet, wireless LAN, the Internet, a wireless network, a bus, or any other communication mechanisms. Further, any suitable combination of wired and/or wireless components and systems may be used to provide network connection 130a (for connecting to customer service terminal 120) and network connection 130b (for connecting to account application system 140). Moreover, network connections 130a, 130b may be embodied using bi-directional or unidirectional communication links. Further, network connections 130a, 130b may implement Web-based protocols, such as Transmission Control Protocol/Internet Protocol (TCP/IP), Hyper Text Transfer Protocol (HTTP), Simple Object Access Protocol (SOAP), and the like.

Application system 140 may be a computing system that includes computer system components that enable system 140 to perform processes consistent with the disclosed embodiments. For example, authorization system 140 may include one or more processing devices, one or more memory devices that store data and executable code used by the processing device(s), input/output devices, network connections devices, and/or any other type of computing component that enable system 140 to process information and send and receive information to and from network 130. In exemplary embodiments, application system 140 processes the account information received from customer service terminal 130 to determine terms of a new financial account for offering to a customer. In other embodiments, however, customer service terminal 120 may itself process the account information received from transceiver 112 to determine a new financial account to offer to the customer.

Application system 140 may process account information and customer information as part of determining financial accounts for offering to customers. The account information processed by application system 140 may, as described above, be the account information received from purchasing device 110. Such account information may include, for example, the following types of information about the account currently associated with purchasing device 110: the account number, the account issuer, the expiration date, the name of the account holder or customer, etc. Financial account application system 140 may also use this information to obtain further information about the account, such as the account's outstanding balance, interest rate, credit limit, etc. Moreover, financial account application system 140 may also obtain additional information about the customer holding the account associated with purchasing device 110. For example, financial account application system 140 may retrieve credit reports from various credit reporting agencies. Financial account application system 140 may then process this account information and customer information to determine, as known in the art, terms of a financial account for offering to the customer.

As described above and in more detail below, financial account application system 140 may then transmit to customer service terminal 120 information identifying the terms of a new financial account for offering to the customer. Such information sent to terminal 120 may include data identifying the new account issuer and data describing the interest rates, fees, credit limits, and any other type of account term identifying or describing the new financial account to the customer.

Figure 2:
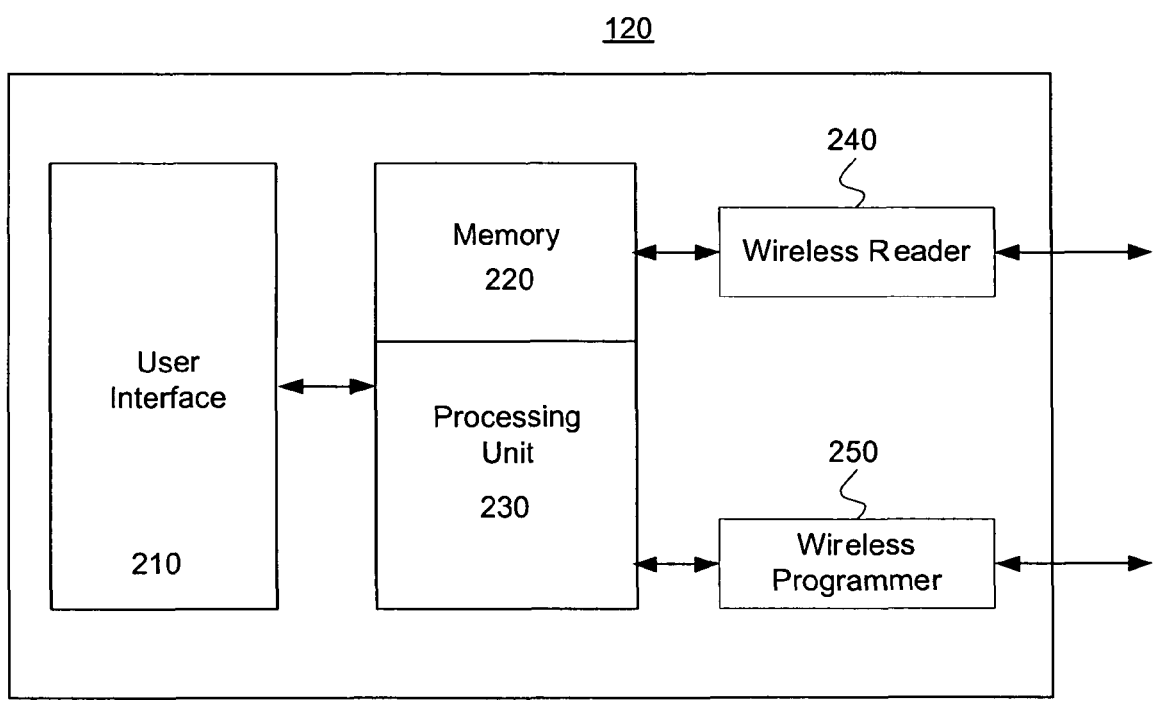
FIG. 2 illustrates an exemplary customer service terminal consistent with certain embodiments of the present invention.

FIG. 2 illustrates an exemplary customer service terminal 120 consistent with certain disclosed embodiments of the present invention. As shown in FIG. 2, terminal 120 may include a user interface 210, a memory 220, a processing unit 230, a wireless reader 240, and a wireless programmer 250. In exemplary embodiments, the components of FIG. 2 may be implemented as a stand-alone terminal, such as a kiosk, that is publicly accessible to different customers.

User interface 210 may be any type of interface for providing information about financial accounts to customers. For example, interface 210 may comprise a display screen, an audio interface (e.g., microphones and speakers), etc. Memory 220 may store software that may be executed by processor 230 to perform financial account processes and wireless transaction processes consistent with the present invention. Processing unit 230 may include one or more central processing units (CPU), microprocessors, or other types of processing devices.

Wireless reader 240 and wireless programmer 250 allow customer service terminal 120 to communicate with transceiver 112 of purchasing device 110. Wireless reader 240 may be any type of device for wirelessly reading data stored on transceiver 112 and/or purchasing device 110. For example, reader 240 may an RFID reader, a smart card reader, or an infrared reader. Similarly, wireless programmer 250 may be any type of device for wirelessly writing or programming information onto transceiver 112 and/or purchasing device 110. In certain exemplary embodiments, wireless programmer 250 may write information transformed into microcode onto transceiver 112 and/or device 112 in a secure format.

Figure 3:
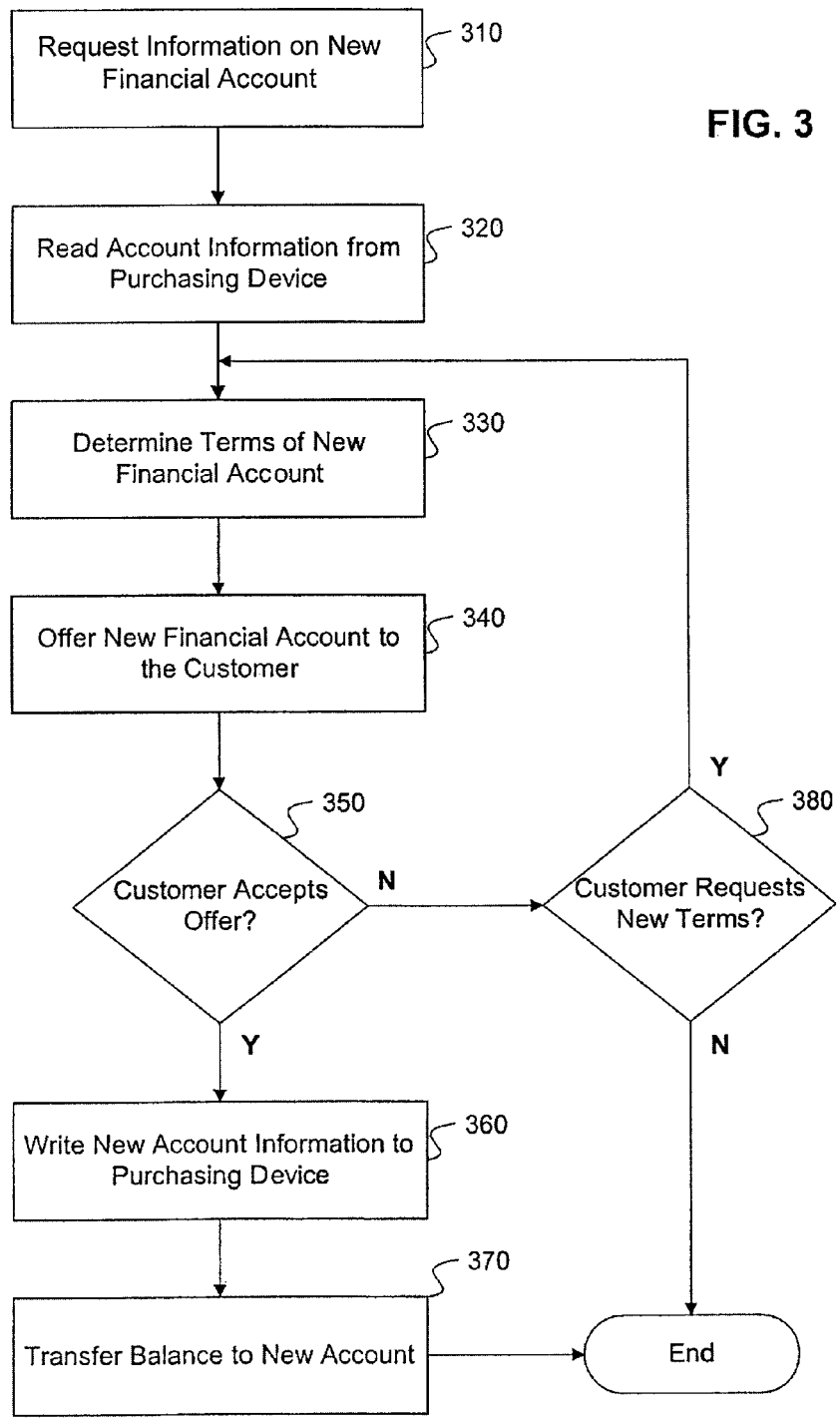
FIG. 3 illustrates an exemplary flow chart of an account offering process consistent with certain embodiments of the present invention.

As described, embodiments consistent with the present invention provide a customer with information about an offered financial account and, if the customer accepts the offer, reprogram the customer's purchasing device 120 with information reflecting the new financial account. FIG. 3 illustrates an exemplary flow chart of an account offering process consistent with certain embodiments of the present invention. As shown in FIG. 3, system 100 may receive a request from a customer for information about a new financial account (step 310). To make the request, the customer may make a selection on terminal 120 that the customer desires information on a new financial account and place purchasing device 110 within the communication range of customer service terminal 120. For example, a customer desiring to obtain information on a new financial account may place purchasing device 110 within an electromagnetic zone of wireless reader 240 of terminal 120. Service terminal 120 may then prompt the customer for further information that may be required to process the request, such as asking the customer to indicate or confirm that the customer wishes to obtain an offer for a new financial account.

Upon customer service terminal 120 establishing communication with purchasing device 110, terminal 120 may then read the account information stored on purchasing device 110 (step 320). For example, customer service terminal 120 may be configured to send an activation signal to transceiver 112 when the customer positions purchasing device 110 within the communication range of terminal 120. Once device 110 becomes activated, wireless reader 240 may then read the account information stored on transceiver 112 and/or device 110. In certain embodiments, transceiver 112 may transmit the stored account information to wireless reader 240, which then converts the transmitted information into a format for processing by terminal 120. The account information read by reader 240 may include, for example, the account number, issuer, and/or expiration date, as well as the name of the account holder or customer.

Based on the account information received from purchasing device 110, system 100 may then determine the terms of a new financial account to be offered to the customer (step 330). In exemplary embodiments, customer service terminal 120 may send the read account information to financial account application system 140. In one embodiment, financial account application system 140 may, as described above, have access to various types of account and customer data used to apply known decisioning techniques for determining terms of a new account for offering to the customer. For example, financial account application system 140 may access credit reporting databases to obtain further information about the customer (e.g., the customer's age, address, credit rating, etc.) or about the customer's current account (e.g., the account's outstanding balance, interest rate, credit limit, etc.). Financial account application system 140 may process this account information and customer information to determine, as known in the art, terms of a financial account for offering to the customer.

Further, as explained above, systems 100 consistent with the present invention make it possible to determine terms of a financial account for offering to the customer based on the terms of the customer's current account. Such account terms may include the interest rate for purchases, the interest rate for the balance transfer sub-account, credit limit, annual fee, etc. In exemplary embodiments, therefore, system 100 may determine the terms of the new financial account such that those terms are better or more favorable to the customer than the terms of the customer's current financial account. A better or more favorable term is one providing more benefit to the customer. Thus, a better or more favorable interest rate applied to purchase transactions may be a lower interest rate, a better or more favorable credit limit may be a higher credit limit, a better or more favorable annual fee may be a lower annual fee, etc. Accordingly, as described above, system 100 may obtain the terms of the customer's current financial account that is associated with purchasing device 110 via the account information received from transceiver 112. System 100 may thus set one or more terms of the new financial account such that it is more favorable to the customer than the customer's current account.

After determining the terms of the new financial account, the system 100 may then offer the new financial account to the customer (step 340). In certain embodiments, customer service terminal 120 may receive the information describing the terms of the new account from financial account application system 140 and, based on that information, offer the customer the new account. For example, user interface 210 of terminal 120 may show to the customer the terms of the new financial account. As part of the offer, terminal 120 may also provide the customer with additional information, such as information on how soon the customer may use the account, when the customer's existing balance on the current account will be transferred to the new account's balance sub-account, or when (or if) the customer's current account will become inactive.

Moreover, in exemplary embodiments, customer service terminal 120 may provide to the customer with a comparison of the terms of the new financial account with the terms of the customer's current financial account (e.g., lower intensive rate, etc.). For instance, user interface 210 may illustrate to the customer how the terms of the new financial account are more favorable than the terms of the customer's existing account. By doing so, system 100 may allow the customer to obtain real-time or near real-time information on the offered account and how it compares to the customer's current account, and thus allowing the customer to intelligently and efficiently decide on the offer.

Customer service terminal 120 may then determine whether the customer has accepted the offer for the new financial account (step 350). A customer may indicate his or her acceptance, for example, by activating a user interface button on terminal 120, calling the financial institution associated with the new account (e.g., terminal 120 may display the telephone number) via terminal 120 or other means, or by any other way signifying the customer's acceptance of the offer.

If the customer accepts the offer (step 350, Yes), then customer service terminal 120 may write the new account information to purchasing device 110 (step 360). For instance, wireless writer 250 may write the new account information to transceiver 112 for storage on either transceiver 112 or purchasing device 112. Upon the customer accepting the account offer, system 100 may then also transfer the customer's outstanding balance from the current account to the balance transfer sub-account (370). System 100 may open the new account for the customer so that the customer may begin using the account for future purchase transactions. Once the balance is transferred and the process of FIG. 3 may end.

If the customer does not accept the new account offer (step 350, No), then customer service terminal 120 may provide a query, via interface 210, requesting whether the customer wishes to seek a second offer having new or different terms (step 380). If so (step 380, Yes), then processing may revert to step 330 for determining new or different terms. If, on the other hand, the customer declines seeking any new or different terms (step 380, No), then the process of FIG. 3 may end.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as storage devices, such as hard disks, floppy disks, a CD-ROM, or other forms of RAM or ROM, etc. Also, aspects of the present invention may be implemented using a carrier wave from the Internet, or similar types of media. Further, the steps of the disclosed methods may be modified in any manner, including by reordering steps and/or inserting or deleting steps, without departing from the principles of the invention.

It is intended, therefore, that the specification and examples be considered as exemplary only, with a true scope and spirit of the invention being indicated by the following claims and their full scope of equivalents.

What is claimed is:

1. A method for offering to a holder of a purchasing device, a new financial account for association with the purchasing device, the method comprising:
   wirelessly reading account information stored on the purchasing device, wherein the wirelessly read account information identifies an existing financial account associated with the purchasing device;
   obtaining information about the existing financial account based on the wirelessly read account information, wherein the obtained information reflects an outstanding balance associated with the existing financial account;
   generating, based on the obtained information, terms for the new financial account for offering to the holder of the purchasing device, wherein the terms include an indication when the new financial account is available for use with the purchasing device;
   wirelessly replacing information of the existing financial account stored on the purchasing device with information reflecting the new financial account if the offer is accepted, wherein after replacement, the wirelessly read account information of the purchasing device identifies the new financial account; and
   transferring the outstanding balance of the existing financial account to a balance transfer sub-account associated with the new account.

2. The method of claim 1, wherein generating the terms for the new financial account further includes:
   determining the terms of the new financial account such that at least one term of the new financial account is more favorable to the holder of the purchasing device than at least one term of the existing financial account.

3. The method of claim 2, wherein the method further comprises:
   providing to the holder of the purchasing device a comparison of the terms of the new financial account with the terms of the existing financial account.

4. The method of claim 1, wherein generating the terms for the new financial account further includes:
   obtaining customer information about the holder of the purchasing device based on the wirelessly read information; and
   generating the terms for the new financial account based on the obtained customer information.

5. The method of 1, wherein wirelessly replacing information of the existing financial account stored on the purchasing device further includes:
   transmitting information about the new financial account to the purchasing device for storage in a memory on the purchasing device.

6. A method for offering, to a holder of a purchasing device, a new financial account for association with the purchasing device, the method comprising:
   wirelessly reading account information stored on the purchasing device, wherein the wirelessly read account information identifies an existing financial account associated with the purchasing device;
   obtaining terms of the existing financial account based on the wirelessly read information identifying the existing financial account;
   generating terms for the new financial account based on the obtained terms of the existing financial account, wherein the terms include an indication when the new financial account is available for use with the purchasing device; and
   offering the new financial account to the holder of the purchasing device; and
   wirelessly replacing information of the existing financial account stored on the purchasing device with information reflecting the new financial account if the offer is accepted, wherein after replacement, the wirelessly read account information of the purchasing device identifies the new financial account.

7. The method of claim 6, wherein reading the account information further includes:
   reading the account information by the use of a Radio Frequency Identification (RFID) reader.

8. The method of claim 6, wherein generating the terms for the new financial account further includes:
   determining the terms of the new financial account such that at least one term of the new financial account is more favorable to the holder of the purchasing device than at least one term of the existing financial account.

9. The method of claim 6, wherein offering the new financial account further includes:
   providing to the holder of the purchasing device a comparison of the terms of the new financial account with the terms of the existing financial account.

10. The method of claim 6, wherein wirelessly replacing information of the existing financial account stored on the purchasing device further includes:
    transmitting information about the new financial account to the purchasing device for storage in a memory on the purchasing device.

11. The method of claim 10, wherein transmitting the account information further includes:
wirelessly transmitting the account information to the purchasing device via a Radio Frequency Identification (RFID) device.

12. The method of claim 11, wherein obtaining terms of the existing financial account further includes:
obtaining information reflecting an outstanding balance associated with the existing financial account.

13. The method of claim 12, further comprising:
transferring the outstanding balance of the existing financial account to a balance transfer sub-account associated with the new account.

14. A system for offering to a holder of a purchasing device, a new financial account for association with the purchasing device, the system comprising:
a publicly accessible kiosk terminal including:
a wireless reader for wirelessly reading account information stored on the purchasing device when a holder of the purchasing devices places the purchasing device within a communication range of the wireless reader, wherein the wirelessly read account information identifies an existing financial account associated with the purchasing device;
a processing unit for determining terms of a new financial account for offering to the holder of the purchasing device based on the wirelessly read account information associated with the existing financial account, wherein the terms include an indication when the new financial account is available for use with the purchasing device;
an interface unit for providing, to the holder of the purchasing device, information about the terms of the new financial account and the terms of the existing financial account, wherein the interface unit may receive an indication that the holder of the purchasing device has accepted the offer of the new financial account; and
a wireless writer for replacing information of the existing financial account stored on the purchasing device with information reflecting the new financial account if the holder of the purchasing device accepts the offer, wherein after replacement, the wirelessly read account information of the purchasing device identifies the new financial account.

15. The system of claim 14, wherein the kiosk terminal communicates with an application system, and wherein the application system includes:
a component that generates the terms of the new financial account.

16. The system of claim 15, wherein the component that generates the terms is configured to generate the terms of the new financial account such that at least one term of the new financial account is more favorable to the holder of the purchasing device than at least one term of the existing financial account.

17. The system of claim 14, wherein the interface unit provides to the holder of the purchasing device a comparison of the terms of the new financial account with the terms of the existing financial account.

18. The system of claim 14, wherein the system further includes:
a component that obtains information reflecting an outstanding balance associated with the existing financial account; and
a component that transfers the outstanding balance of the existing financial account to a balance transfer sub-account associated with the new account.

19. An apparatus for purchasing, comprising:
a transceiver configured to send and receive information over a wireless communication link; and
a processor configured to:
provide existing financial account information stored on a memory device to a service terminal via the transceiver when the apparatus is positioned within a communication range of the service terminal; receive programming information from the service terminal via the transceiver, wherein the programming information includes information for a new financial account that is established based on the existing financial account information provided to the service terminal, wherein the information for the new financial account includes an indication when the new financial account is available for use with the apparatus; and
replace existing financial account information stored on the memory device with information for the new financial account.

* * * * *